Sept. 1, 1964 H. J. MacKAY 3,146,544
FISHING LURE STORAGE FACILITIES
Original Filed Nov. 17, 1960

INVENTOR.
HUGH J. MACKAY
BY

ATTORNEYS

United States Patent Office 3,146,544
Patented Sept. 1, 1964

3,146,544
FISHING LURE STORAGE FACILITIES
Hugh J. MacKay, 1411 N. Bradley Road, Lake Forest, Ill.
Original application Nov. 17, 1960, Ser. No. 69,903, now Patent No. 3,071,885, dated Jan. 8, 1963. Divided and this application Nov. 13, 1962, Ser. No. 237,115
1 Claim. (Cl. 43—57.5)

The present invention is directed to apparatus and facilities for storing artificial fishing lures, such as are exemplified by the many and varied types of flies used in fly fishing.

In fly fishing it is highly desirable to enable the fisherman to conveniently carry a large number of lures and at the same time allow convenient and readily accessible use of the lures. Accordingly, the primary object of the present invention is to form a lure receptacle that enables the fisherman to have convenient use and access to a wide variety of fly lures, while at the same time enabling a compact assembly. A related purpose of the invention is to provide improved means for enabling the fisherman to quickly store and retrieve a wide variety of fishing lures used in the fishing process.

Other objects and purposes will appear from time to time in the course of the ensuing specification and claims, and with reference to the accompanying drawings in which:

Like elements are designated by like characters throughout the specification and drawings.

Figure 1:
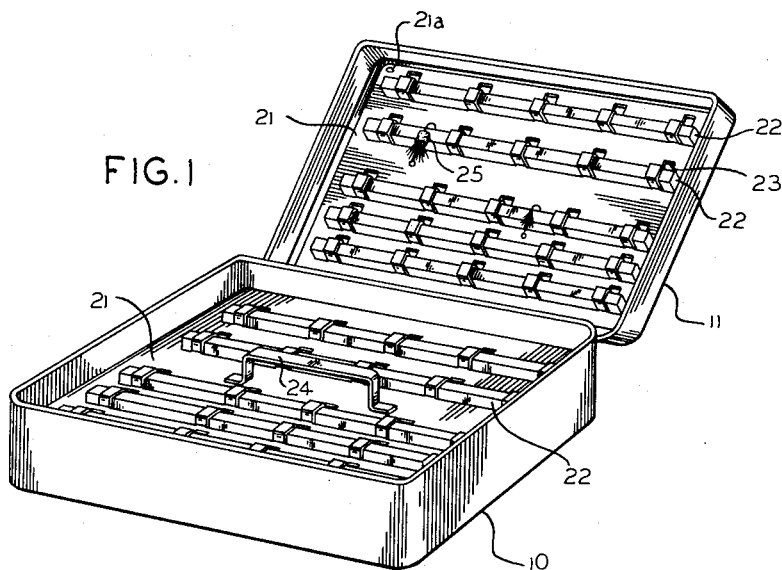
FIGURE 1 is a perspective view of a fishing lure receptacle embodying the principles of the present invention.

With particular reference now to the drawings and in the first instance to FIGURE 1, 10 designates the lower half of a fishing lure and tackle box. An upper cover 11 may be hinged to the lower half 10 in conventional fashion, so as to enable the elements 10 and 11 to be closed one upon the other and secured through any suitable or conventional fastening devices. It should be understood that the receptacle defined by the base 10 and cover 11 may be provided with any suitable facilities for attaching the same to the belt or clothing of the fisherman.

Figure 2:
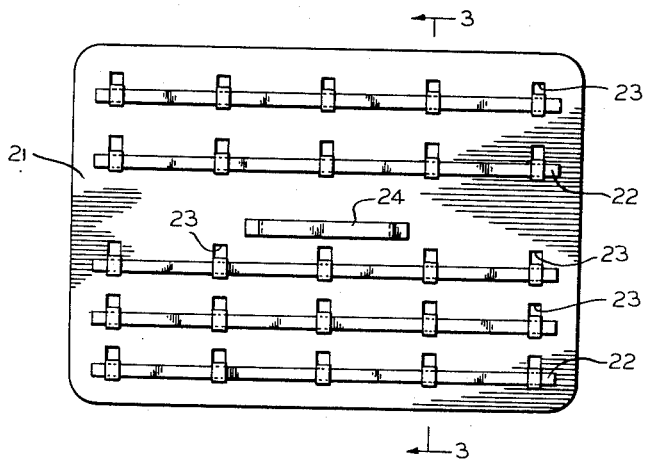
FIGURE 2 is a plan view of the invention.
Figure 3:
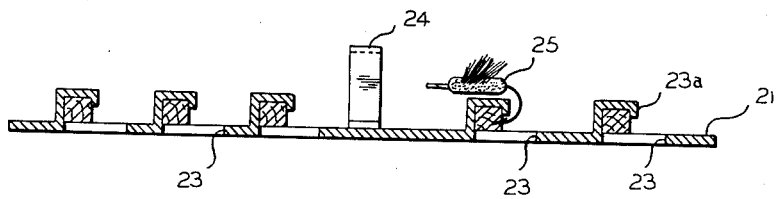
FIGURE 3 is an end view of the sub-assembly illustrated in FIGURE 2 and taken on the section lines 3—3 of FIGURE 2.

In accordance with the present invention, the fly lures are adapted to be stored on plates 21 which may be disposed within the receptacle defined by the base 10 and cover 11. In FIGURES 2 and 3, for example, the plate 21 is shown as supporting a plurality of elongated and generally parallel wood-like strips 22. It should be understood that as used herein, the term "wood-like" is intended to designate actual wood, as for example, balsa wood, cork strips, or other material capable of receiving the barbed ends of fish hooks and holding them in position of the plate 21. The wood-like strips 22 have a generally rectangular cross section so as to present four side surfaces which may be engaged by fishing hooks for retaining lures thereon.

The supporting plate 21 has the material thereof stamped in the form of slots 23, which extend transversely to the strips 22 and have a length greater than the cross sectional width of the strips 22. The material stamped from the slots is bent upwardly into upstanding relation to the plate and is then bent generally parallel to the surface of the plate. It terminates in a downwardly projecting hook portion 23a, thereby enabling retention of the strips 22 within the confines of the hooks defined by these members, the strips 22 themselves resting upon the upper surfaces of the plates.

The plate 21 has a handle 24 fixed thereto to enable convenient lifting of the plate from the interior of the receptacle. It should be understood, of course, that plates formed in the manner of FIGURES 2 and 3 may also be secured to the inner surface of the cover 11.

The cover 11 may have a similar plate 21 disposed therein. It should be understood that the plate 21, if desired, may be fixed to the interior of the receptacle by use of suitable screws or the like 21a. It should be understood that the spacing of the strips on the plates 21 should be such as to prevent interference between the upstanding handle 24 and the strips proper. It is preferred that the handle have a height such with its relation to its position within the receptacle that the upper portion thereof will contact the surface of the cover plate when the cover 11 is in the closed position of the base 10.

The strips 22 may be equally spaced apart on the plate 21 or may be spaced by varying differences so as to properly accommodate both large and small lures.

After the plates and strips have been in use for some time, the user may remove the plates from the receptacle so as to rotate the strips and present a new and undented side of the strips for engagement with the hooks of the lures.

The strips may be revolved through a quarter of a revolution by simply sliding them endwise from beneath the overlying hook portions of the material 23a, rotating the strips, and then reinserting them. The strips are held in place by the frictional engagement between the hook-like portions 23a and the strips, the frictional engagement therebetween being sufficient to hold the strips tightly against the upper surface of the plate 21.

It should be understod that supporting plates as herein illustrated and described may be conveniently formed of metal, although the plates may also be formed from molded plastic, so as to present the characteristic upstanding and overlying hook portions which retain the wood-like strips in position on the supporting plate.

The strips may be spaced at varying distances from adjacent strips, thus properly accommodating large and small lures.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claim.

This is a division of my copending application Serial No. 69,903, now Patent No. 3,071,885.

I claim:

A fishing lure receptacle including a base, and a cover hinged thereto and adapted to overlie and enclose the base, a plate positioned within the receptacle defined by said base and cover, said plate having a plurality of wood-like strips of square cross section disposed thereon in generally parallel fashion, said plate having slotted openings extending transversely to the axes of said wood-like elements, said openings being arranged in parallel rows underlying said strips with the openings in each row being spaced from one another, and a plurality of hook-like members defined from the material of said plate and corresponding in size to the slotted openings, said hook-like members being arranged in similar rows and having portions upstanding from said plate-like element to provide backing surfaces and portions extending generally parallel to the plate and terminating in downwardly bent portions spaced from said upstanding portions and spaced from the plate so as to overlie said plate, said upstanding portion, parallel portion and downwardly bent portion of each member, when taken with the surface of said plate, corresponding to the cross-sectional configuration of said strips so as to slidably receive said strips and hold said strips snugly against the surface of said plate, whereby said wood-like strips are removably held in position on said plate.

References Cited in the file of this patent

UNITED STATES PATENTS

| | | |
|---|---|---|
| 1,133,846 | Fath | Mar. 30, 1915 |
| 1,577,566 | Cryder | Mar. 23, 1926 |
| 2,573,431 | Gibson | Oct. 30, 1951 |

FOREIGN PATENTS

| | | |
|---|---|---|
| 489,055 | Great Britain | July 19, 1938 |